United States Patent [19]

Dörling et al.

[11] Patent Number: 4,478,608
[45] Date of Patent: Oct. 23, 1984

[54] METHOD OF TREATING PROCESS GASES COMING FROM A GASIFICATION REACTOR

[75] Inventors: Rolf Dörling; Ulrich Premel, both of Gummersbach, Fed. Rep. of Germany

[73] Assignee: L. & C. Steinmüller GmbH, Gummersbach, Fed. Rep. of Germany

[21] Appl. No.: 417,871

[22] Filed: Sep. 14, 1982

[30] Foreign Application Priority Data
Sep. 22, 1981 [DE] Fed. Rep. of Germany ....... 3137586

[51] Int. Cl.$^3$ ............................ C10J 3/84; C10J 3/86
[52] U.S. Cl. .................................... 48/210; 48/197 R; 48/128; 55/80; 122/7 R
[58] Field of Search ................... 48/128, 210, 197 R, 48/77; 55/269, 80; 122/7 R, 379, 396; 110/216

[56] References Cited

U.S. PATENT DOCUMENTS

| | | | |
|---|---|---|---|
| 4,018,267 | 4/1977 | Tomasicchio | 122/379 |
| 4,248,604 | 2/1981 | Woldy et al. | 55/80 |
| 4,251,228 | 2/1981 | Meenger et al. | 55/80 |
| 4,270,493 | 6/1981 | Blaskowski | 48/77 |
| 4,309,196 | 1/1982 | Vollhardt | 55/269 |
| 4,324,563 | 4/1982 | Jones et al. | 48/128 |
| 4,395,268 | 7/1983 | Zabelka | 55/269 |

Primary Examiner—S. Leon Bashore
Assistant Examiner—K. M. Hastings
Attorney, Agent, or Firm—Becker & Becker, Inc.

[57] ABSTRACT

A method of treating process gases coming from a gasification reactor before entry of such process gases into a system of waste heat utilization. The process gases are cooled off to a temperature of at least 800° C. before entry thereof into the waste heat system. Thereafter, the gases are extensively freed of solid matter in a cyclone separator system located ahead of the convective cooling system, and thereafter the gases are cooled off further to a temperature of at least 250° C. in a convective cooling system.

1 Claim, 1 Drawing Figure

U.S. Patent   Oct. 23, 1984   4,478,608
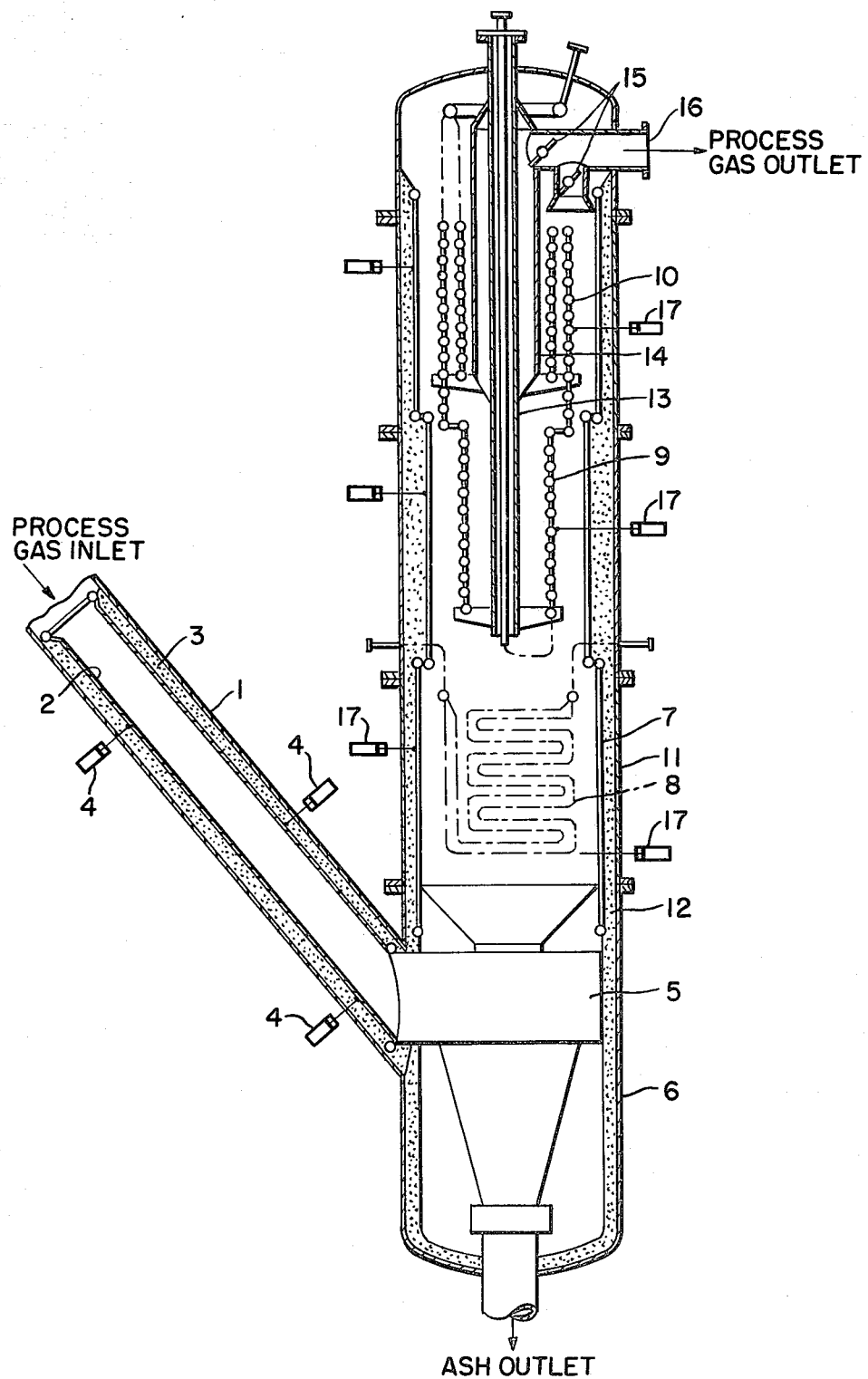

METHOD OF TREATING PROCESS GASES COMING FROM A GASIFICATION REACTOR

The present invention relates to a method of treating process gases, coming from a gasification reactor, before entry of the process gases into a system of waste heat utilization.

With process gases which are generated in a gasification reactor for example those in gasification or destructive distillation of coal, it is necessary to cool off the gasification gases, which exit the reactor at a temperature of approximately 1500° C., to a temperature which renders possible an undisturbed subsequent treatment in a technical process.

Additionally, aside from the cooling-off, it is also worth obtaining an intensive mixing effect of the gasification gases laden with solid and liquid matter along the conveying route thereof in order, in a so-called final cooling which as a rule is operated convectively, to have a gas which is extensively reactively neutral with respect to the heat transfer surfaces installed there.

It is therefore an object of the present invention to provide a method or procedure with which it is possible to treat the process gases coming from the gasification reactor before entry of the process gases into a system of waste heat utilization in such a way that while the process gases are being cooled via heat transfer surfaces, they are being subjected to a continuous thorough mixing effect, and can be transferred largely free of solid matter to a convective cooling system.

This object, and other objects and advantages of the present invention, will appear more clearly from the following specification in connection with the sole FIGURE of the accompanying drawing which illustrates features of the method according to the present invention in connection with a so-called waste-heat boiler, for example, as described in detail subsequently.

The method of the present invention is characterized primarily by steps of cooling down the process gases to a temperature of at least 800° C. before entry thereof into the waste-heat system, thereafter extensively freeing the gases of solid matter in a separator system located ahead of the convective cooling system, and thereafter cooling down the gases further to a temperature of at least 250° C. in a convective cooling system.

The advantages attained with the method according to the present invention include an initial cooling of the process gases already along the conveying route to the separator, whereby nevertheless simultaneously the solid matter is extensively separated off. After that, the process gas, which is extensively freed of solid matter and is already precooled, is supplied to the convective waste-heat system, where the further cooling to, for example, 250° C. is effected. This so-called second cooling phase can be kept extensively constant in relation to the cooling effect, since the solid matter proportion in the process gas is reduced and as a result the convective heat transfer surfaces become dirty less rapidly. The effect of the cooling-off is enhanced still further in the so-called second phase in that the convective heat transfer surfaces can be cleaned from the outside during operation. Striking or beating devices can be used as cleaning elements.

Referring now to the drawing in detail, the process gas coming from the non-illustrated gasification or destructive distillation reactor is cooled off via a line or conduit 1 which contains inner cooling surfaces 2 in the form of tubes having a tube-crosspiece-tube construction. In addition, an insulating packing or refractory material or mass 3 is provided between the so-called tubular cooling surfaces 2 and the tubular wall of the conduit 1. The outside of the process gas conduit 1 is provided with cleaning elements 4 which ensure that the cooling effect of the process gases is maintained in this region in case of fouling or contamination of the heat transfer surfaces. The process gases subsequently enter a so-called cyclone 5 in which a portion of the solid particulate matter contained in the gas is separated off. The cyclone 5 is installed in a container 6 as an integrated component with the so-called convective heat transfer surfaces connected above the cyclone 5. The thorough mixing of a process gas which already started in the tubular conduit 1 continues in the cyclone 5 because of the circulating particles, so that this process gas can flow in a homogeneously mixed manner through the convective cooling region. The region of the waste-heat boiler in which the convective heat transfer occurs is provided with several cooling surfaces. So-called wall cooling surfaces 7 are used which are embodied as vertical heat transfer surfaces of tube-crosspiece-tube construction. The surfaces 7 are centered relative to the outer wall 11 by means of a packing mass 12.

Heat transfer surfaces 8 in platen form are welded to the tube-crosspiece-tube walls and are provided in the inner free space or chamber. A convective cooling surface 9 is provided with helically guided tubes which are likewise welded together with crosspieces. The same is true for the convective cooling surfaces 10. The use of platen heat transfer surfaces 8 in the lower region, and also of helically guided tube-crosspiece-tube cylindrical heat transfer surfaces, serves to counteract the more strongly existing fouling or contamination in the lower region of the waste-heat boiler. The platen-type heat transfer surfaces, and the cylindrical heat transfer surfaces, which are located in the inner free space or chamber of the container 6, are suspended from above in the manner of an immersion heater. The cooling surfaces 7,8,9 and 10 are caused to oscillate from the outside by means of devices 17; as a result, these cooling surfaces are cleaned. The support elements 13 for the cylindrical heat transfer surfaces also serve as flow regulators in conjunction with the tube 14 and a regulating device 15, especially with a view toward maintaining a constant temperature at the outlet 16.

The present invention is, of course, in no way restricted to the specific disclosure of the specification and drawing, but also encompasses any modifications within the scope of the appended claim.

What we claim is:

1. A method of treating process gases, coming from a gasification reactor, prior to entry of said gases into a system of waste heat utilization, said method occurring in a single pressure container and including the successive steps of:
    first cooling down said process gases to a temperature of at least 800° C. prior to entry thereof into said waste heat system;
    then extensively freeing said process gases of solid matter in a cyclone separator system; and
    finally further cooling down said process gases to a temperature of at least 250° C. in a convective cooling system, said first cooling down prior to entry of said process gases into said waste heat system occurring by means of indirect heat exchange;
said further cooling down of said process gases in the convective cooling system occurring by means of wall cooling surfaces including in a lower region of a convective cooling zone with platen-type heat transfer surfaces and in an upper region with cylindrical heat transfer surfaces.

* * * * *